Nov. 17, 1925.
A. M. CAHILL
1,561,458
COMPOUND PRESSURE GAUGE
Filed Oct. 16, 1924
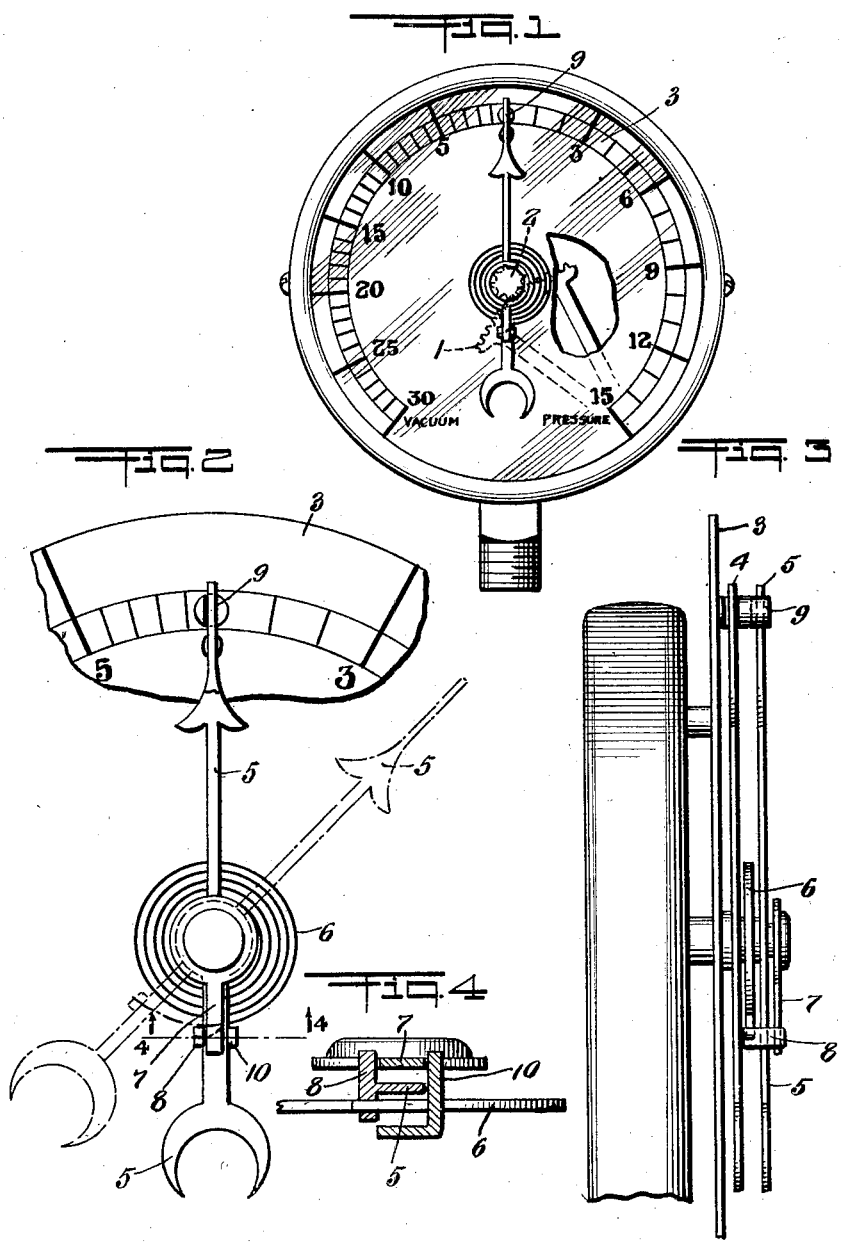
INVENTOR
Anthony M. Cahill
BY
Cooper, Kerr & Dunham
ATTORNEYS Patented Nov. 17, 1925.

1,561,458

UNITED STATES PATENT OFFICE.

ANTHONY MARCUS CAHILL, OF SELLERSVILLE, PENNSYLVANIA, ASSIGNOR TO UNITED STATES GAUGE COMPANY, OF SELLERSVILLE, PENNSYLVANIA, A CORPORATION OF PENNSYLVANIA.

COMPOUND PRESSURE GAUGE.

Application filed October 16, 1924. Serial No. 743,875.

*To all whom it may concern:*

Be it known that I, ANTHONY MARCUS CAHILL, a citizen of the United States of America, residing at Sellersville, in the county of Bucks and State of Pennsylvania, have invented certain new and useful Improvements in Compound Pressure Gauges, of which the following is a full, clear, and exact description.

The invention which forms the subject of this application for Letters Patent is an improvement in compound gauges or those constructed and designed to indicate either a positive or negative pressure, and relates to that form of such gauge in which two pointers are employed.

It is well known that in all compound gauges great difficulty has been met with in always maintaining the indicating pointer at the exact zero position, as the spring heretofore generally employed for this purpose is liable to vary in its elasticity or tension and being necessarily very delicate is not always sufficient to sustain the pointer at the exact zero position when the gauge is turned or used in positions where the weight of the pointer acts by gravity against the force of the spring.

I have, however, designed a double or two pointer gauge of this character which is entirely free from these objections, and which is exceedingly simple in construction and thoroughly reliable in its operation.

In my improved gauge I mount loosely upon the pinion spindle that is turned in either direction to an extent proportional to the pressure in the usual way, two pointers, which are spring impelled in opposite directions until they contact with opposite sides of a fixed stop at the zero point of the scale.

On the pinion shaft or spindle is an arm fixed thereto, which lies in such relation to the two pointers as to move one over the scale in one direction to indicate positive pressure, and the other in the opposite direction to indicate negative pressure. From this it follows that both pointers lie at exactly the zero point at all times except when the gauge is subjected to pressure, when one or the other pointer will be moved to indicate the nature and extent of such pressure, while the other will remain stationary in its normal position.

In the accompanying drawing which illustrates my improvement—

Fig. 1 is a front view in elevation of the complete gauge.

Fig. 2 is a schematic view on an enlarged scale of the operative parts of the invention.

Fig. 3 is a view in side elevation of the same parts, and

Fig. 4 is a sectional view on line 4—4, of Fig. 2

The gauge proper differs in no essential respects from those known in the art and heretofore in common use, and for purposes of the present case it need only be pointed out that a pivoted sector 1 is moved by the expansion or contraction of a Bourdon tube and is geared with a pinion 2 on a spindle or shaft that ordinarily carries a pointer fixed thereto which is moved over a scale 3 to indicate the nature and extent of the pressure.

In my improved instrument I mount two pointers 4 and 5 loosely on this pinion shaft and around the shaft and between the two pointers is placed a light spiral spring 6, the ends of which are connected to the two pointers respectively.

Under these conditions the pointers are impelled in opposite directions, and at the zero point of the scale is a fixed stop 9 cut away at the points where the two pointers contact with it, which serves to maintain both pointers at the exact zero point on the scale.

In lieu of the single pointer which is ordinarily fixed to the pinion shaft, I secure to the shaft an arm 7, and from or on each pointer there is a projection 8, or 10, which lies in the path of movement of the said arm 7. Normally the relatively feeble action of the spring 6 is sufficient to retain the arm 7 in its normal position, and the pointers at zero or in contact with the stop 9; but a positive pressure applied to the gauge turns the arm and also the pointer 5 to the right to indicate the nature and extent of such pressure; whereas a vacuum or negative pressure acting on the gauge turns the pointer 4 to the left to indicate such pressure.

This device is extremely simple, effective and reliable. It has no parts which can get out of order or repair, and it dispenses with all adjustments.

What I claim is:

1. In a compound gauge, the combination with the pinion shaft which is turned in either direction in proportion to the pressure of two pointers loosely mounted thereon and a spring secured to said pointers and adapted to impel them in opposite directions towards a fixed stop at the zero point on the scale, and an arm fixed to the pinion shaft adapted to engage and move one or the other pointer according to the direction in which it is turned.

2. In a compound gauge, the combination with the pinion shaft which is turned in either direction in proportion to the pressure of two pointers loosely mounted thereon, a spiral spring the opposite ends of which are connected to the said pointers respectively, a fixed stop at the zero point of the scale against which the two pointers are impelled by the action of said spring, and an arm fixed to the pinion shaft in the path of movement of which projections on the pointers lie on its opposite sides.

In testimony whereof I hereto affix my signature.

ANTHONY MARCUS CAHILL.